(12) United States Patent
Neystadt et al.

(10) Patent No.: US 12,493,502 B2
(45) Date of Patent: Dec. 9, 2025

(54) REDUCING COSTS FOR ALERTING ENGINES

(71) Applicant: VARONIS SYSTEMS, INC., New York, NY (US)

(72) Inventors: John Eugene Neystadt, Kfar-Saba (IL); Liron Raveh, Pardes Hanna-Karkur (IL)

(73) Assignee: VARONIS SYSTEMS, INC.

( * ) Notice: Subject to any disclaimer, the term of this patent is extended or adjusted under 35 U.S.C. 154(b) by 215 days.

(21) Appl. No.: 18/370,401

(22) Filed: Sep. 20, 2023

(65) Prior Publication Data
US 2025/0094247 A1    Mar. 20, 2025

(51) Int. Cl.
G06F 9/54    (2006.01)
H04L 9/40    (2022.01)

(52) U.S. Cl.
CPC .......... *G06F 9/542* (2013.01); *H04L 63/1416* (2013.01); *H04L 63/20* (2013.01)

(58) Field of Classification Search
CPC ...... G06F 9/542; H04L 63/1416; H04L 63/20
USPC ............................................................ 726/1
See application file for complete search history.

(56) References Cited

U.S. PATENT DOCUMENTS

| | | | |
|---|---|---|---|
| 8,386,602 B2 | 2/2013 | Carey et al. | |
| 8,495,661 B2 | 7/2013 | Carey et al. | |
| 8,868,984 B2 | 10/2014 | Carey et al. | |
| 9,201,756 B2 | 12/2015 | Atkins et al. | |
| 10,853,160 B2 | 12/2020 | Brown | |
| 11,003,773 B1 | 5/2021 | Fang et al. | |
| 11,838,329 B1* | 12/2023 | Lopes | ................... H04L 63/205 |
| 2014/0113588 A1 | 4/2014 | Chekina et al. | |
| 2020/0257279 A1* | 8/2020 | Hokeness | ............ G05B 23/027 |
| 2023/0244660 A1* | 8/2023 | Singh | .................. G06F 11/0751 |
| | | | 707/702 |
| 2023/0325498 A1* | 10/2023 | Whalen | ................. G06F 21/566 |
| | | | 726/23 |
| 2024/0422175 A1* | 12/2024 | Liburdi | ............... H04L 63/1425 |

OTHER PUBLICATIONS

Asaf Shabtai et al.: "'Andromaly': a behavioral malware detection framework for android devices", Journal of Intelligent Information Systems, Kluwer Academic Publishers, BO, vol. 38, No. 1, Jan. 6, 2011 (Jan. 6, 2011), pp. 161-190, XP019998836, ISSN: 1573-7675, DOR: 10.1007/S10844-010-0148-X col. 4, line 19-line 25 col. 14, line 45-line 50 col. 4, line 50-line 55.

* cited by examiner

*Primary Examiner* — Zi Ye
(74) *Attorney, Agent, or Firm* — SOROKER AGMON NORDMAN RIBA

(57) ABSTRACT

A system, including a computer with a processor and memory executing an application configured to perform: receiving one or more events occurring in a computer network, querying a feature suppression list to determine if to suppress generation of specific features, generating features from the received events, which are not in the feature suppression list, examining each feature to determine if to initiate an alert and setting a severity level for the alert, analyzing the alert suppression rules to determine which features serve as a basis for alerts that are acted on and which features serve as a basis for alerts that are suppressed, generating the feature suppression list, listing features that should be suppressed.

18 Claims, 2 Drawing Sheets

REDUCING COSTS FOR ALERTING ENGINES

FIELD OF THE DISCLOSURE

The present disclosure relates to an alerting engine and more specifically to reducing overhead in managing alerts.

BACKGROUND OF THE DISCLOSURE

Monitoring centers with alerting engines are typically employed to protect computer systems and networks by identifying problems and/or attacks on members of the system/network. The alerts are used to notify an administrator or invoke remedial actions.

Typically, the alerting engines are required to process large amounts of data and events, using pre-calculated data "features" to evaluate whether a particular event should trigger an alert. Pre-calculation can be very expensive, as the number of calculations may be very large. When alerts are raised the monitoring center may be overwhelmed with alerts, and only a small number of them actually get acted on. Thus the effort to calculate the features and the alerts, which are not acted on, goes to waste.

While some prior art suggest to suppress noisy events or noisy alerts, this is too coarse, since the same event may be used in conjunction with other events to calculate multiple intermediate "features", from which actual alerts are derived. Some may need to be acted upon and others can be suppressed. Suppressing an entire event would suppress all alerts based upon it. And suppressing only the alert without suppressing the event processing, would still waste effort to calculate "features" for alerts, that are suppressed.

Thus, it is desirable to find methods that reduce the overhead of processing precalculated features when the resulting alerts will be suppressed.

SUMMARY OF THE DISCLOSURE

An aspect of an embodiment of the disclosure, relates to a system and method for reducing the processing cost of an alerting engine by suppressing the expense in processing time and memory for the calculation and generation of features that lead to alerts that are suppressed from being acted upon.

The system monitors events in a communication network and includes predefined features that are generated from the information of the events. The features are examined to determine if an alert should be initiated based on the existence of the feature and a severity level is assigned to the alert. The alerts are analyzed by an alert engine, which acts to deal with the alerts. An alert suppression list is prepared defining rules for handling the alerts. Based on the alert suppression rules the system concludes, which features should be generated and which features should not be generated since they result in alerts that are anyways suppressed.

There is thus provided according to an embodiment of the disclosure, a system, comprising:
A computer with a processor and memory executing an application configured to perform:
Receiving one or more events occurring in a computer network;
Querying a feature suppression list to determine if to suppress generation of specific features;
Generating features from the received events, which are not in the feature suppression list;
Examining each feature to determine if to initiate an alert and setting a severity level for the alert;
Analyzing alert suppression rules to determine which features serve as a basis for alerts that are acted on and which features serve as a basis for alerts that are suppressed;
Generating the feature suppression list, listing features that should be suppressed.

In an embodiment of the disclosure, the features are generated by pre-configured calculations. Optionally, at least one event participates in generation of multiple features. In an embodiment of the disclosure, at least one feature is generated from multiple events. Optionally, at least one feature is generated from a sequence of events that occur during a specific amount of time. In an embodiment of the disclosure, at least one feature is generated from a sequence of different events that occur simultaneously. Optionally, the system includes an event suppression list that suppresses events in addition to the feature suppression list. In an embodiment of the disclosure, alert suppression miles are created automatically by a rule generator based on the alerts that are acted upon. Optionally, the alert suppression rules suppress handling a user under attack but do not suppress handling an organization under attack. In an embodiment of the disclosure, the features consider the categories or classifications of the events over time.

There is further provided according to an embodiment of the disclosure, a method, comprising:
A computer with a processor and memory receiving by an application, one or more events occurring in a computer network;
Querying a feature suppression list to determine if to suppress generation of specific features;
Generating features from the received events, which are not in the feature suppression list;
Examining each feature to determine if to initiate an alert and setting a severity level for the alert;
Analyzing the alert suppression rules to determine which features serve as a basis for alerts that are acted on and which features serve as a basis for alerts that are suppressed;
Generating the feature suppression list, listing features that should be suppressed.

There is further provided according to an embodiment of the disclosure, a non-transitory computer readable medium comprising instructions, which when executed perform the method described above.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

Figure 1:
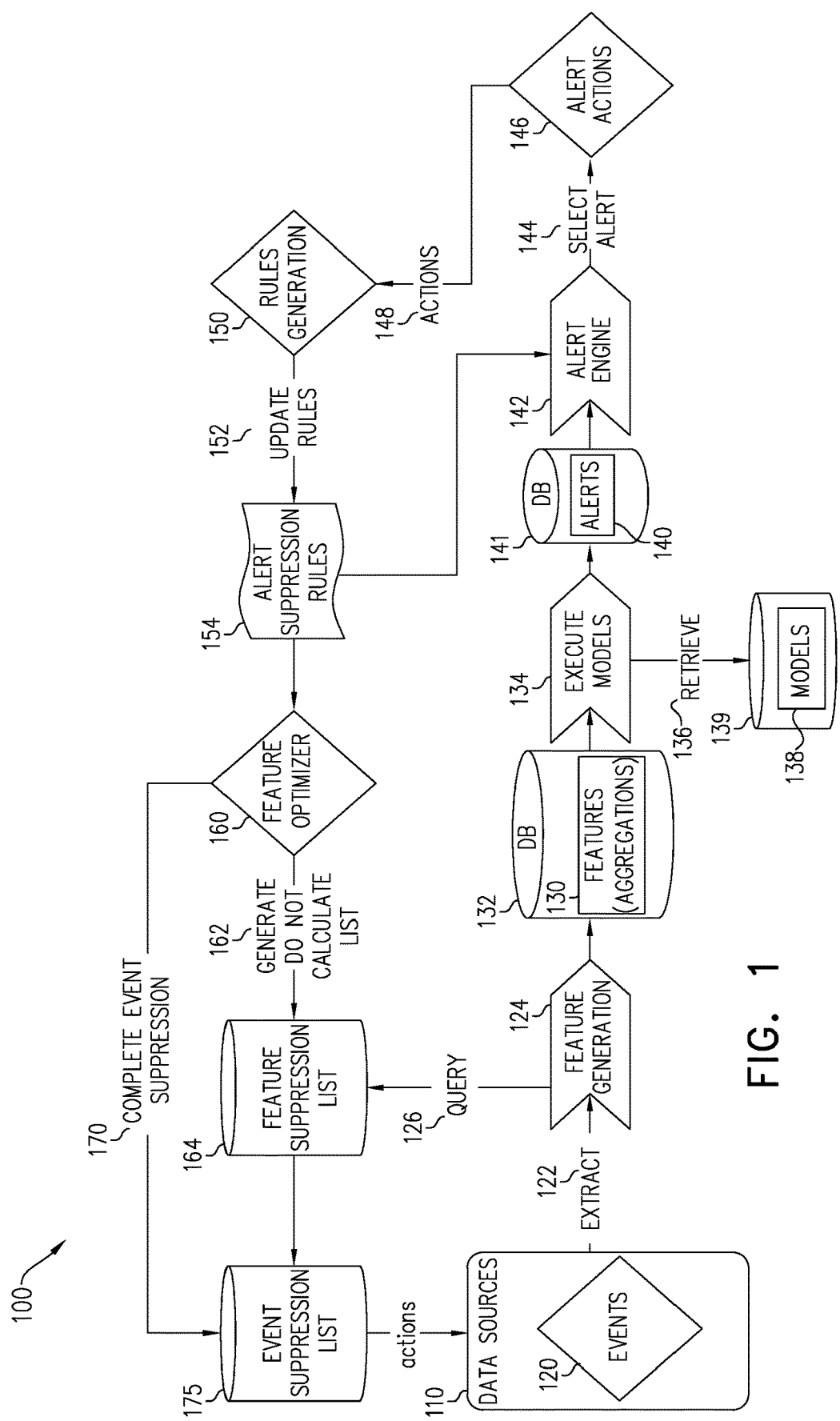
FIG. 1 is a flow diagram of a process of activating alerts responsive to features generated from events, according to an embodiment of the disclosure.
Figure 2:
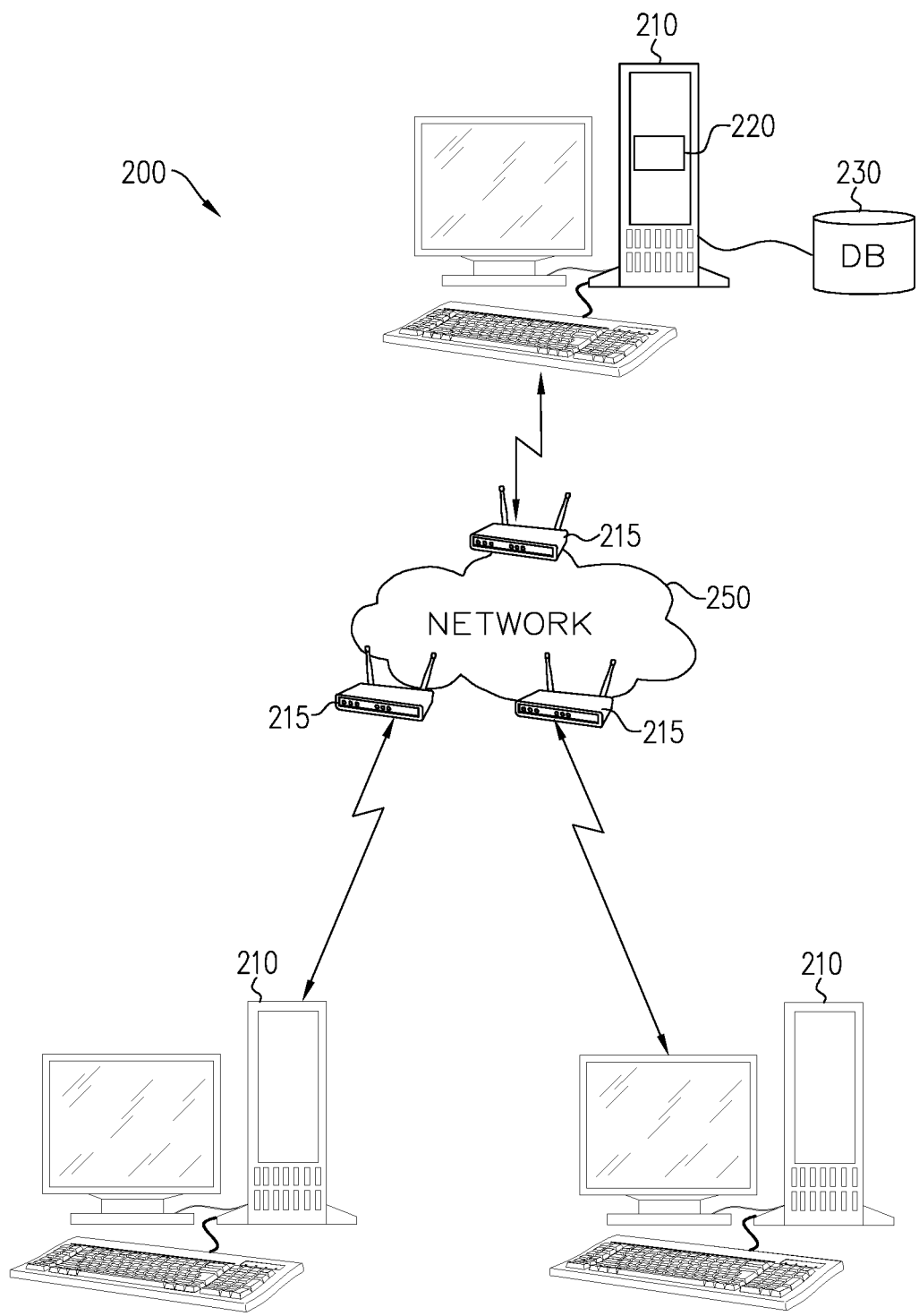
FIG. 2. Is a schematic illustration of a system for activating alerts responsive to features generated from events, according to an embodiment of the disclosure.

FIG. 1 is a flow diagram of a process 100 of activating alerts 140 responsive to features 130 generated from events 120 and FIG. 2. Is a schematic illustration of a system 200 for activating alerts 140 responsive to features 130 generated from events 120, according to an embodiment of the disclosure. System 200 includes one or more data sources 110, which participate in a communication network 250 (e.g., a corporate network or wide area network (WAN)). Optionally, the data sources 110 may include computers 210, routers 215, mobile devices and other equipment that communicate, over the network 250. Optionally, the data sources 110 in system 200 produce events for example one computer attempting to connect to another and being denied access and/or being awarded access. Alternatively or additionally, the events may include data from log lines that collect process information in the network. In an embodiment of the disclosure, one or more computers 210 include an application 220 to monitor the events 120 and generate alerts 140 before system 200 to act upon. Optionally, the computer 210 includes a database 230 to store lists of events 120, features 130 and/or alerts 140.

In an embodiment of the disclosure, application 220 extracts 122 features from the logs and events 120 to generate 124 features 130 and store them in a feature storage 132 for example in database 230. Optionally, the features are pre-configured to be generated by applying a specific calculation to information from the logs and events.

The events 120 may include:
1. Windows Active Directory (AD) producing a login denied event, which includes an attribute that contains the username.
2. Web Proxy producing an event connection denied, with attributes including a URL, a username, and a web site classification.

Optionally, from the $1^{st}$ event 120 the monitoring system, may generate 124 the following features 130:
1. Failed logins total per hour;
2. Failed logins per user per hour;
3. Failed logins per user per minute.

Optionally, from the $2^{nd}$ event 120, which indicates access to a prohibited web site, based on web site classification—e.g., command & control or malware downloads, so that multiple features 130 would be maintained, for example:
1. Denied connections per URL per minute;
2. Denied connections per user per minute.

Optionally, the features 130 may be calculated from a sequence of events 120 over time or from a sequence of different events 120 that occur sequentially or simultaneously or during a specific amount of time.

The features 130 can be of different types, and their computation and storage can be expensive for the system 200.

The features 130 may include calculation related to (some of which may be computationally expensive):
1. Flags—for example time-series: how many times a certain flag appears in events in a given time interval;
2. Counters—for example counting appearance of a specific event over a given time interval;
3. Categorizers based on lookups in external storage—for example repetitions of events of a specific category;
4. Classifiers, such as image or text recognition—for example repetition of events with specific content;
5. Regular expressions and rules for text matching—for example time series of matching a regular expression in the information of events;
6. LLM processors, tokenize and convert text or image to vectors by an LLM to a series of floating numbers which are an output from an LLM, and identifying a specific pattern over time in the events.

A specific event 120 may participate in generation 124 of multiple features 130 or multiple events 120 may participate in generation of a single features 130. In some embodiments of the disclosure, an event 120 suppression list 175 can be generated 170 from the information from an alert engine 142 to avoid looking at irrelevant events 120. Thus, eliminating the need to retrieve and process irrelevant events 120. However, the event 120 may be used to generate 124 multiple features 130, some which are needed and some that can be suppressed. By eliminating an entire event 120 important features 130 may be suppressed and not generated 124 thus eliminating alerts 140 that are important and processed.

In an embodiment of the disclosure, a feature suppression list 164 is generated 162 based on the information from the alert engine 142 to avoid generating features 130 that will anyway be suppressed. Optionally, for each event 120 the feature suppression list 164 is queried 126 (e.g., based on feature properties such as feature name, user name and other attributes). Accordingly, for each new event 120, preselected features 130 are generated unless the feature 130 is in the feature suppression list 164. The generated features 130 are stored in a feature storage 132. In an embodiment of the disclosure, application 220 retrieves 136 relevant models 138 from a model storage 139, which are preprogrammed to analyze the features 130. Optionally, the relevant models 138 are executed 134 to examine each feature 130 to determine if an alert needs to be initiated and to determine a severity of the alert. For example for the following features 130:
1. Over 100 failed logins by different users in total, indicate an attack on an organization;
2. Over 50 failed logins/denied connections per minute, indicate an attack on an organization;
3. Over 10 failed logins per minute for a specific user, indicate an attack on the specific user;
4. Over 10 failed connections per minute per user, indicate that a specific user account may be compromised.

In an embodiment of the disclosure, the models 138 use preprogrammed logic to decide whether to raise an alert indicating a detected incident. In the above case, there may be 2 alerts:
1. User under attack—when there is an attempt to input more than 20 wrong passwords per minute for the same user.
   a. 20 wrong passwords would be considered medium severity.
   b. 100 wrong passwords would be considered high severity.
2. Organization under attack—when a total number of failed logins in an organizational network exceeds 100 per minute.
   a. 100 would be medium severity.
   b. 500 would be high severity.

Optionally, the severity of the alert 140 may be affected by the data source that led to the event 120 and/or the subject involved (e.g., user/component).

In an embodiment of the disclosure, the alerts 140 that result from execution 134 of the models 138 are stored in an alert database 141. Optionally, an alert engine 142 analyzes the alerts 140 and determines which alerts 140 to act upon and which alerts 140 should be suppressed based on alert suppression rules 154. Optionally, alert engine 142 selects 144 an alert from the database 141, for example the most severe alert and uses an alert action module 146 to takes actions 148 to handle the alert 140. For example, blocking communication lines, turning off routers 215 or instructing a server/computer 210 to stop responding to specific types of communications. Optionally, the alert suppression rules 154 can be created or updated 152 manually by a human operator or automatically by a rule generator 150. The rule generator 150 may be configured to observe the actions 148 taken and review which alerts 140 were acted upon, and which were ignored.

In an embodiment of the disclosure, a feature optimizer 160 analyzes the alert suppression rules 154 to determine, which features 130 serve as a basis for alerts 140 that are acted on, and which features 130 serve as a basis for alerts 140 that are suppressed. Feature optimizer 160 generates 162 the feature suppression list 164, which is queried 126 when generating 124 the features 130 to save the processing and storage costs required to generate features 130 that will not be used. Optionally, if the feature optimizer 160 identifies that no feature 130 is based on a particular event 120, it can also generate 170 the event suppression list 175 and configure the data sources 110 to avoid generating events 120 of that type or skip extracting 122 such events 120 from the data source 110.

In an exemplary case in system 200 the suppression rules 154 may suppress a "user under attack alert" but not suppress an "organization under attack alert". Thus, in this case a "login denied event" cannot be suppressed since a "failed logins total per hour" feature is required to generate "organization under attack alerts". However, features such as "failed logins per user per hour" and "failed logins per user per minute" can be suppressed.

In an embodiment of the disclosure, alert suppression rules 154 that are used by alert engine 142 to evaluate each alert 140 can be expressed so that each attribute of the alert 140 is matched to a condition, for example:

1. Severity>medium;
2. User==John Doe;
3. Data Source location is France.

The alert suppression rules 154 may be combined, in a variety of ways, such as:

1. Hierarchical, so that the most precise rules override less precise rules;
2. Ordered so that rules are executed in order;
3. Combined using AND/OR and grouping statements.

In an embodiment of the disclosure, feature optimizer 160 converts the alert suppression rules 154 into an optimized lookup structure as alerts 140 arrive. Optionally, alert suppression rules 154 can be converted into an acyclic graph, using known techniques such as tainted data tracking. From the compiled graph, feature optimizer 160 can derive a list of features 130 and attributes that can be suppressed and store them into feature suppression list 164. Then when a new event 120 arrives, Feature generation 124 will query 126 the feature suppression list 164 and skip feature generation 124 if a match is found.

In an embodiment of the disclosure, application 220 and any other software models (e.g., 138) may be stored on a non-transitory computer readable memory and provided to a computer or computers such as computers 210, which include a processor and memory. The applications 220 and models 138 can be loaded into the memory of the computer and executed by the processor to implement the methods described above for reducing costs in handling alerts. Optionally, the non-transitory memory may be a CD, DVD, flash disk or other non-volatile memory devices.

It should be appreciated that the above-described methods and apparatus may be varied in many ways, including omitting, or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure.

It will be appreciated by persons skilled in the art that the present invention is not limited to what has been particularly shown and described hereinabove. Rather the scope of the present invention is defined only by the claims, which follow.

We claim:

1. A system, comprising:
    a computer with a processor and memory executing an application configured to perform:
    receiving one or more events occurring in a computer network;
    querying a feature suppression list to determine if to suppress generation of specific features;
    generating features from the received events, which are not in the feature suppression list;
    examining each feature to determine if to initiate an alert and setting a severity level for the alert;
    analyzing alert suppression rules to determine which features serve as a basis for alerts that are acted on and which features serve as a basis for alerts that are suppressed;
    generating the feature suppression list, listing features that should be suppressed;
    wherein the alert suppression rules suppress handling a user under attack but do not suppress handling an organization under attack.

2. The system of claim 1, wherein the features are generated by pre-configured calculations.

3. The system of claim 1, wherein at least one event participates in generation of multiple features.

4. The system of claim 1, wherein at least one feature is generated from multiple events.

5. The system of claim 1, wherein at least one feature is generated from a sequence of events that occur during a specific amount of time.

6. The system of claim 1, wherein at least one feature is generated from a sequence of different events that occur simultaneously.

7. The system of claim 1, wherein the system includes an event suppression list that suppresses events in addition to the feature suppression list.

8. The system of claim 1, wherein alert suppression rules are created automatically by a rule generator based on the alerts that are acted upon.

9. The system of claim 1, wherein the features consider the categories or classifications of the events over time.

10. A method, comprising:
    a computer with a processor and memory receiving by an application, one or more events occurring in a computer network;
    querying a feature suppression list to determine if to suppress generation of specific features;
    generating features from the received events, which are not in the feature suppression list;
    examining each feature to determine if to initiate an alert and setting a severity level for the alert;
    analyzing the alert suppression rules to determine which features serve as a basis for alerts that are acted on and which features serve as a basis for alerts that are suppressed;
    generating the feature suppression list, listing features that should be suppressed;

wherein the alert suppression rules suppress handling a user under attack but do not suppress handling an organization under attack.

11. The method of claim 10, wherein the features are generated by pre-configured calculations.

12. The method of claim 10, wherein at least one event participates in generation of multiple features.

13. The method of claim 10, wherein at least one feature is generated from multiple events.

14. The method of claim 10, wherein at least one feature is generated from a sequence of events that occur during a specific amount of time.

15. The method of claim 10, wherein at least one feature is generated from a sequence of different events that occur simultaneously.

16. The method of claim 10, wherein the system includes an event suppression list that suppresses events in addition to the feature suppression list.

17. The method of claim 10, wherein alert suppression rules are created automatically by a rule generator based on the alerts that are acted upon.

18. A non-transitory computer readable medium comprising instructions, which when executed perform the method of claim 10.

* * * * *